United States Patent
Reiter et al.

(10) Patent No.: US 10,445,432 B1
(45) Date of Patent: Oct. 15, 2019

(54) METHOD AND APPARATUS FOR LIGHTWEIGHT MULTILINGUAL NATURAL LANGUAGE REALIZER

(71) Applicant: Arria Data2Text Limited, Aberdeen (GB)

(72) Inventors: Ehud Baruch Reiter, Aberdeen (GB); Ross John Turner, Aberdeen (GB); William Anthony Bradshaw, Aberdeen (GB); Henriette Anna Elisabeth Viethen, Sydney (AU)

(73) Assignee: ARRIA DATA2TEXT LIMITED, Aberdeen (GB)

( * ) Notice: Subject to any disclaimer, the term of this patent is extended or adjusted under 35 U.S.C. 154(b) by 341 days.

(21) Appl. No.: 15/252,939

(22) Filed: Aug. 31, 2016

(51) Int. Cl.
*G06F 17/27* (2006.01)
*G06F 17/28* (2006.01)
*G06F 17/22* (2006.01)

(52) U.S. Cl.
CPC ...... *G06F 17/2881* (2013.01); *G06F 17/2247* (2013.01); *G06F 17/2755* (2013.01); *G06F 17/2775* (2013.01); *G06F 17/2785* (2013.01); *G06F 17/271* (2013.01)

(58) Field of Classification Search
CPC combination set(s) only.
See application file for complete search history.

(56) References Cited

U.S. PATENT DOCUMENTS

| | | |
|---|---|---|
| 5,181,250 A | 1/1993 | Morgan et al. |
| 5,237,502 A | 8/1993 | White et al. |
| 5,311,429 A | 5/1994 | Tominaga |
| 5,321,608 A | 6/1994 | Namba et al. |
| 5,629,687 A | 5/1997 | Sutton et al. |
| 5,794,177 A | 8/1998 | Carus et al. |
| 5,802,488 A | 9/1998 | Edatsune |
| 6,023,669 A | 2/2000 | Suda et al. |
| 6,078,914 A | 6/2000 | Redfern |
| 6,138,087 A | 10/2000 | Budzinski |
| 6,266,617 B1 | 7/2001 | Evans |
| 6,442,485 B2 | 8/2002 | Evans |
| 6,466,899 B1 | 10/2002 | Yano et al. |
| 6,665,640 B1 | 12/2003 | Bennett et al. |

(Continued)

FOREIGN PATENT DOCUMENTS

| | | |
|---|---|---|
| AU | 2011247830 B2 | 12/2011 |
| AU | 2011253627 B2 | 12/2011 |

(Continued)

OTHER PUBLICATIONS

U.S. Appl. No. 13/186,346, filed Jul. 19, 2011; In re: Nichols et al., entitled *Method and Apparatus for Triggering the Automatic Generation of Narratives.*

(Continued)

*Primary Examiner* — Vu B Hang
(74) *Attorney, Agent, or Firm* — Alston & Bird LLP

(57) ABSTRACT

Methods, apparatuses, and computer program products are described herein that are configured to be embodied as a natural language realizer in the form of a lightweight multilingual realizer. In some example embodiments, a method is provided that comprises generating syntactically correct natural language. The method of this embodiment may also include at a syntax processor, propagating features among a group of words, and adding closed class function words and morphological inflections.

13 Claims, 6 Drawing Sheets

(56) References Cited

U.S. PATENT DOCUMENTS

| | | |
|---|---|---|
| 6,717,513 B1 | 4/2004 | Sandelman et al. |
| 6,947,885 B2 | 9/2005 | Bangalore et al. |
| 7,043,420 B2 | 5/2006 | Ratnaparkhi |
| 7,167,824 B2 | 1/2007 | Kallulli |
| 7,231,341 B2 | 6/2007 | Bangalore et al. |
| 7,238,313 B2 | 7/2007 | Ferencz et al. |
| 7,305,336 B2 | 12/2007 | Polanyi et al. |
| 7,310,969 B2 | 12/2007 | Dale |
| 7,346,493 B2 | 3/2008 | Ringger et al. |
| 7,418,447 B2 | 8/2008 | Caldwell et al. |
| 7,424,363 B2 | 9/2008 | Cheng et al. |
| 7,444,287 B2 | 10/2008 | Claudatos et al. |
| 7,496,621 B2 | 2/2009 | Pan et al. |
| 7,526,424 B2 | 4/2009 | Corston-Oliver et al. |
| 7,533,089 B2 | 5/2009 | Pan et al. |
| 7,562,005 B1 | 7/2009 | Bangalore et al. |
| 7,684,991 B2 | 3/2010 | Stohr et al. |
| 7,711,581 B2 | 5/2010 | Hood et al. |
| 7,783,486 B2 | 8/2010 | Rosser et al. |
| 7,809,552 B2 | 10/2010 | Pan et al. |
| 7,849,048 B2 | 12/2010 | Langseth et al. |
| 7,849,049 B2 | 12/2010 | Langseth et al. |
| 7,856,390 B2 | 12/2010 | Schiller |
| 7,873,509 B1 | 1/2011 | Budzinski |
| 7,921,091 B2 | 4/2011 | Cox et al. |
| 7,930,169 B2 | 4/2011 | Billerey-Mosier |
| 7,933,774 B1 | 4/2011 | Begeja et al. |
| 7,966,172 B2 | 6/2011 | Ruiz et al. |
| 7,970,601 B2 | 6/2011 | Burmester et al. |
| 7,979,267 B2 | 7/2011 | Ruiz et al. |
| 8,019,610 B2 | 9/2011 | Walker et al. |
| 8,024,331 B2 | 9/2011 | Calistri-Yeh et al. |
| 8,037,000 B2 | 10/2011 | Delmonico et al. |
| 8,082,144 B1 | 12/2011 | Brown et al. |
| 8,090,727 B2 | 1/2012 | Lachtarnik et al. |
| 8,150,676 B1 | 4/2012 | Kaeser |
| 8,175,873 B2 | 5/2012 | Di Fabbrizio et al. |
| 8,180,647 B2 | 5/2012 | Walker et al. |
| 8,180,758 B1 | 5/2012 | Cornali |
| 8,229,937 B2 | 7/2012 | Kiefer et al. |
| 8,355,903 B1 | 1/2013 | Birnbaum et al. |
| 8,374,848 B1 | 2/2013 | Birnbaum et al. |
| 8,425,325 B2 | 4/2013 | Hope |
| 8,473,911 B1 | 6/2013 | Baxter |
| 8,494,944 B2 | 7/2013 | Schiller |
| 8,515,733 B2 | 8/2013 | Jansen |
| 8,515,737 B2 | 8/2013 | Allen |
| 8,548,814 B2 | 10/2013 | Manuel-Devadoss |
| 8,548,915 B2 | 10/2013 | Antebi et al. |
| 8,561,014 B2 | 10/2013 | Mengusoglu et al. |
| 8,566,090 B2 | 10/2013 | Di Fabbrizio et al. |
| 8,589,148 B2 | 11/2013 | Atallah et al. |
| 8,589,172 B2 | 11/2013 | Alonso et al. |
| 8,616,896 B2 | 12/2013 | Lennox |
| 8,620,669 B2 | 12/2013 | Walker et al. |
| 8,626,613 B2 | 1/2014 | Dale et al. |
| 8,630,844 B1 | 1/2014 | Nichols et al. |
| 8,655,889 B2 | 2/2014 | Hua et al. |
| 8,676,691 B2 | 3/2014 | Schiller |
| 8,688,434 B1 | 4/2014 | Birnbaum et al. |
| 8,700,396 B1 | 4/2014 | Mengibar et al. |
| 8,738,384 B1 | 5/2014 | Bansal et al. |
| 8,738,558 B2 | 5/2014 | Antebi et al. |
| 8,762,134 B2 | 5/2014 | Reiter |
| 8,762,133 B2 | 6/2014 | Reiter |
| 8,775,161 B1 | 7/2014 | Nichols et al. |
| 8,825,533 B2 | 9/2014 | Basson et al. |
| 8,843,363 B2 | 9/2014 | Birnbaum et al. |
| 8,849,670 B2 | 9/2014 | Di Cristo et al. |
| 8,886,520 B1 | 11/2014 | Nichols et al. |
| 8,892,417 B1 | 11/2014 | Nichols et al. |
| 8,892,419 B2 | 11/2014 | Lundberg et al. |
| 8,898,063 B1 | 11/2014 | Sykes et al. |
| 8,903,711 B2 | 12/2014 | Lundberg et al. |
| 8,903,718 B2 | 12/2014 | Akuwudike |
| 8,909,595 B2 | 12/2014 | Gandy et al. |
| 8,914,452 B2 | 12/2014 | Boston et al. |
| 8,924,330 B2 | 12/2014 | Antebi et al. |
| 8,930,305 B2 | 1/2015 | Namburu et al. |
| 8,977,953 B1 | 3/2015 | Pierre et al. |
| 8,984,051 B2 | 3/2015 | Olsen et al. |
| 9,002,695 B2 | 4/2015 | Watanabe et al. |
| 9,002,869 B2 | 4/2015 | Riezler et al. |
| 9,015,730 B1 | 4/2015 | Allen et al. |
| 9,028,260 B2 | 5/2015 | Nanjiani et al. |
| 9,092,276 B2 | 7/2015 | Allen et al. |
| 9,104,720 B2 | 8/2015 | Rakshit et al. |
| 9,110,882 B2 | 8/2015 | Overell et al. |
| 9,110,977 B1 | 8/2015 | Pierre et al. |
| 9,111,534 B1 | 8/2015 | Sylvester et al. |
| 9,135,244 B2 | 9/2015 | Reiter |
| 9,135,662 B2 | 9/2015 | Evenhouse et al. |
| 9,146,904 B2 | 9/2015 | Allen |
| 9,164,982 B1 | 10/2015 | Kaeser |
| 9,190,054 B1 | 11/2015 | Riley et al. |
| 9,208,147 B1 | 12/2015 | Nichols et al. |
| 9,229,927 B2 | 1/2016 | Wolfram et al. |
| 9,240,197 B2 | 1/2016 | Begeja et al. |
| 9,244,894 B1 | 1/2016 | Dale et al. |
| 9,251,134 B2 | 2/2016 | Birnbaum et al. |
| 9,251,143 B2 | 2/2016 | Bird et al. |
| 9,263,039 B2 | 2/2016 | Di Cristo et al. |
| 9,268,770 B1 | 2/2016 | Kursun |
| 9,323,743 B2 | 4/2016 | Reiter |
| 9,396,181 B1 | 7/2016 | Sripada et al. |
| 9,405,448 B2 | 8/2016 | Reiter |
| 9,600,471 B2 | 3/2017 | Bradshaw et al. |
| 9,640,045 B2 | 5/2017 | Reiter |
| 9,990,360 B2 | 6/2018 | Sripada |
| 10,026,274 B2 | 7/2018 | Reiter |
| 2002/0026306 A1 | 2/2002 | Bangalore et al. |
| 2003/0131315 A1 | 7/2003 | Escher |
| 2003/0212545 A1 | 11/2003 | Kallulli |
| 2004/0246120 A1 | 12/2004 | Benner et al. |
| 2005/0039107 A1 | 2/2005 | Hander et al. |
| 2005/0228635 A1 | 10/2005 | Araki et al. |
| 2005/0256703 A1 | 11/2005 | Markel |
| 2006/0085667 A1 | 4/2006 | Kubota et al. |
| 2006/0178868 A1 | 8/2006 | Billerey-Mosier |
| 2006/0259293 A1 | 11/2006 | Orwant |
| 2007/0078655 A1 | 4/2007 | Semkow et al. |
| 2007/0106628 A1 | 5/2007 | Adjali et al. |
| 2007/0129942 A1 | 6/2007 | Ban et al. |
| 2007/0143099 A1 | 6/2007 | Balchandran et al. |
| 2008/0221865 A1 | 9/2008 | Wellmann |
| 2008/0221870 A1 | 9/2008 | Attardi et al. |
| 2008/0281781 A1 | 11/2008 | Zhao et al. |
| 2008/0312954 A1 | 12/2008 | Ullrich et al. |
| 2009/0089100 A1 | 4/2009 | Nenov et al. |
| 2009/0089126 A1 | 4/2009 | Odubiyi |
| 2009/0111486 A1 | 4/2009 | Burstrom |
| 2009/0156229 A1 | 6/2009 | Hein et al. |
| 2009/0198496 A1 | 8/2009 | Denecke |
| 2009/0281839 A1 | 11/2009 | Lynn et al. |
| 2009/0286514 A1 | 11/2009 | Lichorowic et al. |
| 2009/0287567 A1 | 11/2009 | Penberthy et al. |
| 2010/0146491 A1 | 6/2010 | Hirano et al. |
| 2010/0153095 A1 | 6/2010 | Yang et al. |
| 2010/0174545 A1 | 7/2010 | Otani |
| 2010/0191658 A1 | 7/2010 | Kannan et al. |
| 2010/0203970 A1 | 8/2010 | Hope |
| 2010/0332235 A1 | 12/2010 | David |
| 2011/0010164 A1 | 1/2011 | Williams |
| 2011/0068929 A1 | 3/2011 | Franz et al. |
| 2011/0087486 A1 | 4/2011 | Schiller |
| 2011/0160986 A1 | 6/2011 | Wu et al. |
| 2011/0179006 A1 | 7/2011 | Cox et al. |
| 2011/0218822 A1 | 9/2011 | Buisman et al. |
| 2011/0225185 A1 | 9/2011 | Gupta |
| 2011/0257839 A1 | 10/2011 | Mukherjee |
| 2012/0078888 A1 | 3/2012 | Brown et al. |
| 2012/0084027 A1 | 4/2012 | Caine |
| 2012/0136649 A1 | 5/2012 | Freising et al. |
| 2012/0158089 A1 | 6/2012 | Bocek et al. |

(56) References Cited

U.S. PATENT DOCUMENTS

| | | |
|---|---|---|
| 2012/0173475 A1 | 7/2012 | Ash et al. |
| 2012/0290289 A1 | 11/2012 | Manera et al. |
| 2012/0310990 A1 | 12/2012 | Viegas et al. |
| 2013/0030810 A1 | 1/2013 | Kopparapu et al. |
| 2013/0066873 A1 | 3/2013 | Salvetti et al. |
| 2013/0144606 A1 | 6/2013 | Birnbaum et al. |
| 2013/0151238 A1 | 6/2013 | Beaurpere et al. |
| 2013/0185050 A1 | 6/2013 | Birnbaum et al. |
| 2013/0174026 A1 | 7/2013 | Locke |
| 2013/0211855 A1 | 8/2013 | Eberle et al. |
| 2013/0238329 A1 | 9/2013 | Casella dos Santos |
| 2013/0238330 A1 | 9/2013 | Casella dos Santos |
| 2013/0238987 A1 | 9/2013 | Lutwyche |
| 2013/0251233 A1 | 9/2013 | Yang et al. |
| 2013/0268263 A1 | 10/2013 | Park et al. |
| 2013/0293363 A1 | 11/2013 | Plymouth et al. |
| 2013/0311201 A1 | 11/2013 | Chatfield et al. |
| 2014/0019531 A1 | 1/2014 | Czajka et al. |
| 2014/0025371 A1 | 1/2014 | Min |
| 2014/0039878 A1 | 2/2014 | Wasson |
| 2014/0052696 A1 | 2/2014 | Soroushian |
| 2014/0062712 A1 | 3/2014 | Reiter |
| 2014/0067377 A1 | 3/2014 | Reiter |
| 2014/0072947 A1 | 3/2014 | Boguraev et al. |
| 2014/0072948 A1 | 3/2014 | Boguraev et al. |
| 2014/0089212 A1 | 3/2014 | Sbodio |
| 2014/0100846 A1 | 4/2014 | Haine et al. |
| 2014/0100901 A1 | 4/2014 | Haine et al. |
| 2014/0100923 A1 | 4/2014 | Strezo et al. |
| 2014/0143720 A1 | 5/2014 | Dimarco et al. |
| 2014/0149107 A1 | 5/2014 | Schilder |
| 2014/0164303 A1 | 6/2014 | Bagchi et al. |
| 2014/0164304 A1 | 6/2014 | Bagchi et al. |
| 2014/0188477 A1 | 7/2014 | Zhang |
| 2014/0278358 A1 | 9/2014 | Byron et al. |
| 2014/0281935 A1 | 9/2014 | Byron et al. |
| 2014/0281951 A1 | 9/2014 | Megiddo et al. |
| 2014/0297268 A1 | 10/2014 | Govrin et al. |
| 2014/0316768 A1 | 10/2014 | Khandekar |
| 2014/0375466 A1 | 12/2014 | Reiter |
| 2014/0379322 A1 | 12/2014 | Koutrika et al. |
| 2014/0379378 A1 | 12/2014 | Cohen-Solal et al. |
| 2015/0006437 A1 | 1/2015 | Byron et al. |
| 2015/0032443 A1 | 1/2015 | Karov et al. |
| 2015/0081307 A1 | 3/2015 | Cederstrom et al. |
| 2015/0081321 A1 | 3/2015 | Jain |
| 2015/0095015 A1 | 4/2015 | Lani et al. |
| 2015/0106307 A1 | 4/2015 | Antebi et al. |
| 2015/0142418 A1 | 5/2015 | Byron et al. |
| 2015/0142421 A1 | 5/2015 | Buurman et al. |
| 2015/0154359 A1 | 6/2015 | Harris et al. |
| 2015/0163358 A1 | 6/2015 | Klemm et al. |
| 2015/0169522 A1 | 6/2015 | Logan et al. |
| 2015/0169548 A1 | 6/2015 | Reiter |
| 2015/0169659 A1 | 6/2015 | Lee et al. |
| 2015/0169720 A1 | 6/2015 | Byron et al. |
| 2015/0169737 A1 | 6/2015 | Bryon et al. |
| 2015/0179082 A1 | 6/2015 | Byron et al. |
| 2015/0227508 A1 | 8/2015 | Howald et al. |
| 2015/0242384 A1 | 8/2015 | Reiter |
| 2015/0261744 A1 | 9/2015 | Suenbuel et al. |
| 2015/0261836 A1 | 9/2015 | Madhani et al. |
| 2015/0279348 A1 | 10/2015 | Cao et al. |
| 2015/0310013 A1 | 10/2015 | Allen et al. |
| 2015/0310112 A1 | 10/2015 | Allen et al. |
| 2015/0310861 A1 | 10/2015 | Waltermann et al. |
| 2015/0324343 A1 | 11/2015 | Carter et al. |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0324413 A1 | 11/2015 | Gubin et al. |
| 2015/0325000 A1 | 11/2015 | Sripada |
| 2015/0326622 A1 | 11/2015 | Carter et al. |
| 2015/0331845 A1 | 11/2015 | Guggilla et al. |
| 2015/0331846 A1 | 11/2015 | Guggilla et al. |
| 2015/0332670 A1 | 11/2015 | Akbacak et al. |
| 2015/0347400 A1 | 12/2015 | Sripada |
| 2015/0356127 A1 | 12/2015 | Pierre et al. |
| 2015/0363363 A1 | 12/2015 | Bohra et al. |
| 2015/0363364 A1 | 12/2015 | Sripada |
| 2015/0363382 A1 | 12/2015 | Bohra et al. |
| 2015/0363390 A1 | 12/2015 | Mungi et al. |
| 2015/0363391 A1 | 12/2015 | Mungi et al. |
| 2015/0371651 A1 | 12/2015 | Aharoni et al. |
| 2016/0019200 A1 | 1/2016 | Allen |
| 2016/0027125 A1 | 1/2016 | Bryce |
| 2016/0055150 A1 | 2/2016 | Bird et al. |
| 2016/0132489 A1 | 5/2016 | Reiter |
| 2016/0140090 A1 | 5/2016 | Dale et al. |
| 2016/0217133 A1 | 7/2016 | Reiter et al. |
| 2016/0232152 A1 | 8/2016 | Mahamood |
| 2016/0328371 A1 | 11/2016 | Logan et al. |
| 2016/0328381 A1 | 11/2016 | Reiter |
| 2016/0328385 A1 | 11/2016 | Reiter |
| 2017/0018107 A1 | 1/2017 | Reiter |

FOREIGN PATENT DOCUMENTS

| | | |
|---|---|---|
| AU | 2013201755 A1 | 9/2013 |
| AU | 2013338351 A1 | 5/2015 |
| CA | 2577721 C | 3/2006 |
| CA | 2826116 C | 3/2006 |
| CN | 103999081 A | 8/2014 |
| CN | 104182059 A | 12/2014 |
| CN | 104881320 A | 9/2015 |
| EP | 1336955 B1 | 8/2003 |
| EP | 2707809 A1 | 3/2014 |
| EP | 2750759 A1 | 7/2014 |
| EP | 2849103 A2 | 3/2015 |
| GB | 2518192 A | 3/2015 |
| JP | S61221873 A | 10/1986 |
| JP | 2004021791 A | 1/2004 |
| JP | 2014165766 A | 9/2014 |
| WO | WO 2000/074394 A2 | 12/2000 |
| WO | WO 2002/031628 A3 | 4/2002 |
| WO | WO 2002/073449 A1 | 9/2002 |
| WO | WO 2002/073531 A1 | 9/2002 |
| WO | WO 2006/010044 A2 | 1/2006 |
| WO | WO 2007/041221 A1 | 4/2007 |
| WO | WO 2009/014465 A2 | 1/2009 |
| WO | WO 2010/049925 A2 | 5/2010 |
| WO | WO 2010/051404 A1 | 5/2010 |
| WO | WO 2012/071571 A2 | 5/2012 |
| WO | WO 2013/009613 A1 | 1/2013 |
| WO | WO 2013/042115 A2 | 3/2013 |
| WO | WO 2013/042116 A1 | 3/2013 |
| WO | WO 2013/177280 A1 | 11/2013 |
| WO | WO 2014/035402 A1 | 3/2014 |
| WO | WO 2014/098560 A2 | 6/2014 |
| WO | WO 2014/140977 A1 | 9/2014 |
| WO | WO 2014/187076 A1 | 11/2014 |
| WO | WO 2015/028844 A1 | 3/2015 |
| WO | WO 2015/113301 A1 | 8/2015 |
| WO | WO 2015/148278 A1 | 10/2015 |
| WO | WO 2015/159133 A1 | 10/2015 |
| WO | WO 2015/164253 A1 | 10/2015 |
| WO | WO 2015/175338 A1 | 11/2015 |
| WO | WO 2016/004266 A2 | 1/2016 |

OTHER PUBLICATIONS

Alawneh et al., "Pattern Recognition Techniques Applied to the Abstraction of Traces of Inter-Process Communication," Software Maintenance and Reengineering (CSMR), 2011 15th European Conference on Year: 2011, IEEE Conference Publications, pp. 211-220, (2011).

Andre et al., "From Visual Data to Multimedia Presentations," Grounding Representations: Integration of Sensory Information in Natural Language Processing, Artificial Intelligence and Neural networks, IEE Colloquium on, pp. 1-3, (1995).

Andre et al., "Natural Language Access to Visual Data: Dealing with Space and Movement," Report 63, German Research Center

(56) References Cited

OTHER PUBLICATIONS for Artificial Intelligence (DFKI) SFB 314, Project VITRA, pp. 1-21, (1989).
Barzilay et al.; "Aggregation via Set Partitioning for Natural Language Generation", Proceedings of the Human Language Technology Conference of the North American Chapter of the ACL; pp. 359-366; (2006).
Bhoedjang et al., "Optimizing Distributed Data Structures Using Application-Specific Network Interface Software," Parallel Processing, Proceedings; International Conference on Year: 1998, IEEE Conference Publications, pp. 485-492, (1998).
Cappozzo et al., "Surface-Marker Cluster Design Criteria for 3-D Bone Movement Reconstruction," IEEE Transactions on Biomedical Engineering, 44(12):1165-1174, (1997).
Dalianis et al.; "Aggregation in Natural Language Generation;" Trends in Natural Language Generation, an Artificial Intelligence Perspective; pp. 88-105; (1993).
Dragon et al., "Multi-Scale Clustering of Frame-to-Frame Correspondences for Motion Segmentation," Computer Vision ECCV, Springer Berlin Heidelberg, pp. 445-458, (2012).
Gatt et al.,"From Data to Text in the Neonatal Intensive Care Unit: Using NLG Technology for Decision Support and Information Management," AI Communication, pp. 153-186, (2009).
Gorelov et al., "Search Optimization in Semistructured Databases Using Hierarchy of Document Schemas," Programming and Computer Software, 31(6):321-331, (2005).
Herzog et al., "Combining Alternatives in the Multimedia Presentation of Decision Support Information for Real-Time Control," IFIP, 15 pages,(1998).
Kottke et al., "Motion Estimation via Cluster Matching," 8180 IEEE Transactions on Pattern Analysis and Machine Intelligence, 16(11):1128-1132, (1994).
Kukich, "Knowledge-Based Report Generation: A Knowledge-Engineering Approach to Natural Language Report Generation," Dissertation to The Interdisciplinary Department of Information Science, University of Pittsburg, 260 pages, (1983).
Leonov et al., "Construction of an Optimal Relational Schema for Storing XML Documents in an RDBMS Without Using DTD/XML Schema," Programming and Computer Software, 30(6):323-336, (2004).
Perry et al., "Automatic Realignment of Data Structures to Improve MPI Performance," Networks (ICN), Ninth International Conference on Year: 2010, IEEE Conference Publications, pp. 42-47, (2010).
Quinlan, "Induction of Decision Trees," Machine Learning, Kluwer Academic Publishers, 1(1):81-106, (1986).
Radev et al.,"Generating Natural Language Summaries from Multiple On-Line Sources," Association of Computational Linguistics, 24(3):469-500, (1998).
Reiter et al., "Building Applied Natural Language Generation Systems," Natural Language Engineering 1 (1), 31 pages, (1995).
Reiter et al.; "Studies in Natural Language Processing—Building Natural Language Generation Systems," Cambridge University Press, (2000).
Reiter, "An Architecture for Data-to-Text Systems," Proceedings of ENLG-2007, pp. 97-104, (2007).
Shaw, "Clause Aggregation Using Linguistic Knowledge;" Proceedings of IWNLG, pp. 138-147, (1998). Retrieved from <http://acl.ldc.upenn.edu/W/W98/W98-1415.pdf>.
Spillner et al., "Algorithms for Dispersed Processing," Utility and Cloud Computing (UC), 204 IEEE/ACM 7th International Conference on Year: 2014, IEEE Conferenced Publications, pp. 914-921, (2014).
Voelz et al., "Rocco: A RoboCup Soccer Commentator System," German Research Center for Artificial Intelligence DFKI GmbH, 11 pages, (1999).
Yu et al., "Choosing the Content of Textual Summaries of Large Time-Series Data Sets," Natural Language Engineering, 13:1-28, (2007).
International Preliminary Report on Patentability for Application No. PCT/IB2012/056513 dated May 19, 2015.
International Preliminary Report on Patentability for Application No. PCT/IB2012/056514 dated May 19, 2015.
International Preliminary Report on Patentability for Application No. PCT/IB2012/057773 dated Jun. 30, 2015.
International Preliminary Report on Patentability for Application No. PCT/IB2012/057774 dated Jun. 30, 2015.
International Preliminary Report on Patentability for Application No. PCT/IB2013/050375 dated Jul. 21, 2015.
International Preliminary Report on Patentability for Application No. PCT/IB2013/058131 dated May 5, 2015.
International Preliminary Report on Patentability for Application No. PCT/IB2014/060846 dated Oct. 18, 2016.
International Preliminary Report on Patentability for Application No. PCT/US2012/053115 dated Mar. 3, 2015.
International Preliminary Report on Patentability for Application No. PCT/US2012/053127 dated Mar. 3, 2015.
International Preliminary Report on Patentability for Application No. PCT/US2012/053128 dated Mar. 3, 2015.
International Preliminary Report on Patentability for Application No. PCT/US2012/053156 dated Mar. 3, 2015.
International Preliminary Report on Patentability for Application No. PCT/US2012/053183 dated Mar. 3, 2015.
International Preliminary Report on Patentability for Application No. PCT/US2012/061051 dated Mar. 3, 2015.
International Preliminary Report on Patentability for Application No. PCT/US2012/063343 dated May 5, 2015.
International Search Report and Written Opinion for Application No. PCT/IB2012/056513 dated Jun. 26, 2013.
International Search Report and Written Opinion for Application No. PCT/IB2012/056514 dated Jun. 26, 2013.
International Search Report and Written Opinion for Application No. PCT/IB2012/057773 dated Jul. 1, 2013.
International Search Report and Written Opinion for Application No. PCT/IB2012/057774 dated Sep. 20, 2013.
International Search Report and Written Opinion for Application No. PCT/IB2013/050375 dated May 7, 2013.
International Search Report and Written Opinion for Application No. PCT/IB2013/058131 dated Jul. 3, 2014.
International Search Report and Written Opinion for Application No. PCT/IB2014/060846 dated Feb. 4, 2015.
International Search Report and Written Opinion for Application No. PCT/US2012/053115 dated Jul. 24, 2013.
International Search Report and Written Opinion for Application No. PCT/US2012/053127 dated Jul. 24, 2013.
International Search Report and Written Opinion for Application No. PCT/US2012/053128 dated Jun. 27, 2013.
International Search Report and Written Opinion for Application No. PCT/US2012/053156 dated Sep. 26, 2013.
International Search Report and Written Opinion for Application No. PCT/US2012/053183 dated Jun. 4, 2013.
International Search Report and Written Opinion for Application No. PCT/US2012/061051 dated Jul. 24, 2013.
International Search Report and Written Opinion for Application No. PCT/US2012/063343; dated Jan. 15, 2014.
Notice of Allowance for U.S. Appl. No. 14/023,023 dated Apr. 11, 2014.
Notice of Allowance for U.S. Appl. No. 14/023,056 dated Apr. 29, 2014.
Notice of Allowance for U.S. Appl. No. 14/311,806 dated Dec. 28, 2016.
Notice of Allowance for U.S. Appl. No. 14/311,998 dated Dec. 22, 2015.
Notice of Allowance for U.S. Appl. No. 14/311,998 dated Jan. 21, 2016.
Notice of Allowance for U.S. Appl. No. 14/634,035 dated Mar. 30, 2016.
Notice of Allowance for U.S. Appl. No. 15/421,921 dated Mar. 14, 2018.
Office Action for U.S. Appl. No. 14/023,023 dated Mar. 4, 2014.
Office Action for U.S. Appl. No. 14/023,056 dated Nov. 21, 2013.
Office Action for U.S. Appl. No. 14/311,806 dated Jun. 10, 2016.

(56) References Cited

OTHER PUBLICATIONS

Office Action for U.S. Appl. No. 14/311,998 dated Feb. 20, 2015.
Office Action for U.S. Appl. No. 14/311,998 dated Oct. 7, 2015.
Office Action for U.S. Appl. No. 14/634,035 dated Aug. 28, 2015.
Office Action for U.S. Appl. No. 14/634,035 dated Dec. 10, 2015.
Office Action for U.S. Appl. No. 14/634,035 dated Mar. 30, 2016.
Office Action for U.S. Appl. No. 15/074,425 dated Feb. 26, 2018.
Office Action for U.S. Appl. No. 15/074,425 dated May 10, 2017.
Office Action for U.S. Appl. No. 15/188,423 dated Jul. 20, 2018.
Office Action for U.S. Appl. No. 15/188,423 dated Oct. 23, 2017.
Office Action for U.S. Appl. No. 15/421,921 dated Sep. 27, 2017.
Statement in accordance with the Notice from the European patent Office dated Oct. 1, 2007 concerning business methods (OJ EPO Nov. 2007, 592-593, (XP002456414) 1 page.
U.S. Appl. No. 12/779,636; entitled "System and Method for Using Data to Automatically Generate a Narrative Story" filed May 13, 2010.
U.S. Appl. No. 13/186,308; entitled "Method and Apparatus for Triggering the Automatic Generation of Narratives" filed Jul. 19, 2011.
U.S. Appl. No. 13/186,329; entitled "Method and Apparatus for Triggering the Automatic Generation of Narratives" filed Jul. 19, 2011.
U.S. Appl. No. 13/186,337; entitled "Method and Apparatus for Triggering the Automatic Generation of Narratives" filed Jul. 19, 2011.
U.S. Appl. No. 13/464,635; entitled "Use of Tools and Abstraction in a Configurable and Portable System for Generating Narratives" filed May 4, 2012.
U.S. Appl. No. 13/464,675; entitled "Configurable and Portable System for Generating Narratives" filed May 4, 2012.
U.S. Appl. No. 13/464,716; entitled "Configurable and Portable System for Generating Narratives" filed May 4, 2012.
U.S. Appl. No. 14/023,023; entitled "Method and Apparatus for Alert Validation;" filed Sep. 10, 2013.
U.S. Appl. No. 14/023,056; entitled "Method and Apparatus for Situational Analysis Text Generation;" filed Sep. 10, 2013.
U.S. Appl. No. 14/027,684; entitled "Method, Apparatus, and Computer Program Product for User-Directed Reporting;" filed Sep. 16, 2013.
U.S. Appl. No. 14/027,775; entitled "Method and Apparatus for Interactive Reports;" filed Sep. 16, 2013.
U.S. Appl. No. 14/311,806; entitled Method and Apparatus for Alert Validation; In re: Reiter, filed Jun. 23, 2014.
U.S. Appl. No. 14/311,998, entitled Method and Apparatus for Situational Analysis Text Generation; In re: Reiter; filed Jun. 23, 2014.
U.S. Appl. No. 14/634,035, entitled Method and Apparatus for Annotating a Graphical Output; In re: Reiter; filed Feb. 27, 2015.
U.S. Appl. No. 14/914,461, filed Feb. 25, 2016; In re: Reiter et al., entitled Text Generation From Correlated Alerts.
U.S. Appl. No. 15/022,420, filed Mar. 16, 2016; In re: Mahamood, entitled Method and Apparatus for Document Planning.
U.S. Appl. No. 15/074,425, filed Mar. 18, 2016; In re: Reiter, entitled Method and Apparatus for Situational Analysis Text Generation.
U.S. Appl. No. 15/093,337, filed Apr. 7, 2016; In re: Reiter, entitled Method and Apparatus for Referring Expression Generation.
U.S. Appl. No. 15/093,365, filed Apr. 7, 2016; In re: Logan et al., entitled Method and Apparatus for Updating a Previously Generated Text.
U.S. Appl. No. 15/188,423, filed Jun. 21, 2016; In re: Reiter, entitled Method and Apparatus for Annotating a Graphical Output.
U.S. Appl. No. 15/421,921, filed Feb. 1, 2017; In re: Reiter, entitled Method and Apparatus for Alert Validation.

US 10,445,432 B1

METHOD AND APPARATUS FOR LIGHTWEIGHT MULTILINGUAL NATURAL LANGUAGE REALIZER

TECHNOLOGICAL FIELD

Embodiments of the present invention relate generally to natural language generation technologies and, more particularly, relate to a method, apparatus, and computer program product for lightweight multilingual natural language realization.

BACKGROUND

In some examples, a natural language generation (NLG) system is configured to transform raw input data that is expressed in a non-linguistic format into a format that can be expressed linguistically, such as through the use of natural language. For example, raw input data may take the form of a value of a stock market index over time and, as such, the raw input data may include data that is suggestive of a time, a duration, a value and/or the like. Therefore, an NLG system may be configured to input the raw input data and output text that linguistically describes the value of the stock market index; for example, "Securities markets rose steadily through most of the morning, before sliding downhill late in the day."

Data that is input into a NLG system may be provided in, for example, a recurrent formal structure. The recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. In some examples, the output of the NLG system is text in a natural language (e.g. English, Japanese or Swahili), but may also be in the form of synthesized speech.

BRIEF SUMMARY

Methods, apparatuses, and computer program products are described herein that are configured to be embodied as and/or performed by a lightweight multilingual natural language realizer. In one example embodiment, a method comprises accessing a realization element data structure, wherein the realization element data structure is a syntactic representation of phrases and sentences; and accessing at least one syntax rule file at a syntax processor in a natural language realizer, wherein the at least one syntax rule file is configured for a language. The method of this embodiment may also include generating a syntactically processed realization element data structure, at the syntax processor, using the at least one syntax rule file in the syntax processor. The method of this embodiment may further include generating a syntactically processed realization element data structure by: propagating features in the realization element data structure by comparing one or more realization elements in the realization element data structure; and adding closed class function words and morphological inflections by utilizing rules from the language syntax rule file to determine closed class function words and morphological inflections to add to the base words and phrases in the realization element data structure.

BRIEF DESCRIPTION OF THE DRAWINGS

Figure 1:
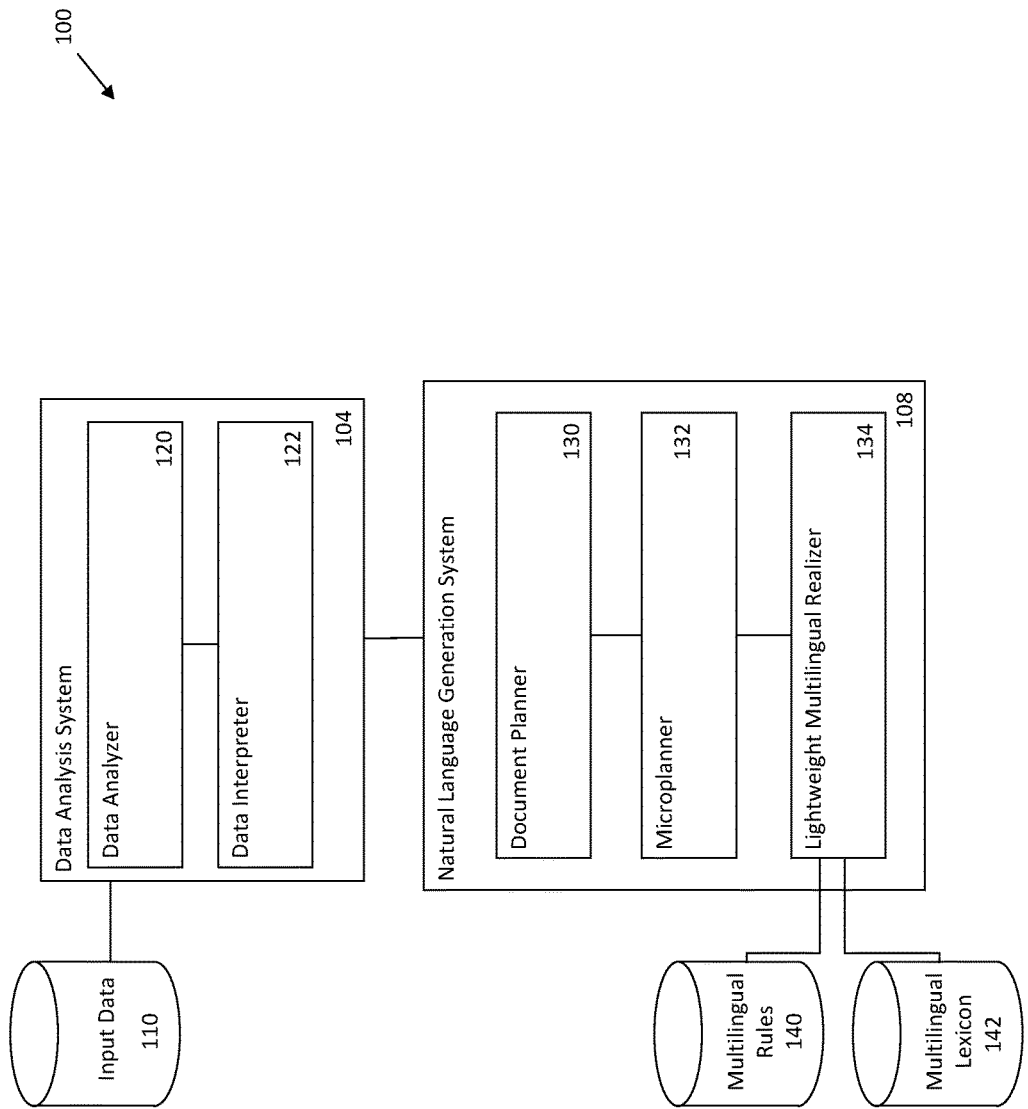
Figure 2:
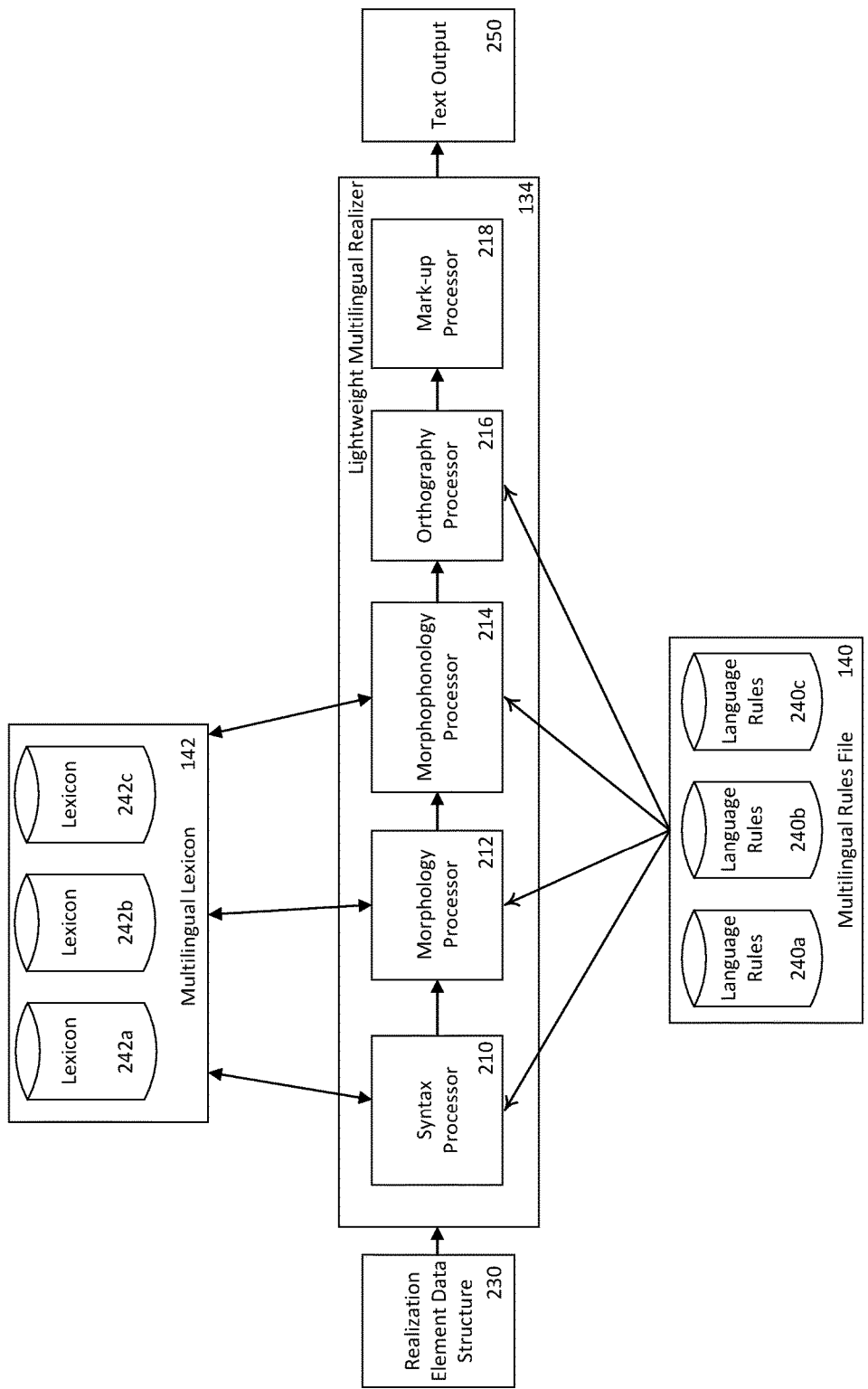
Figure 3:
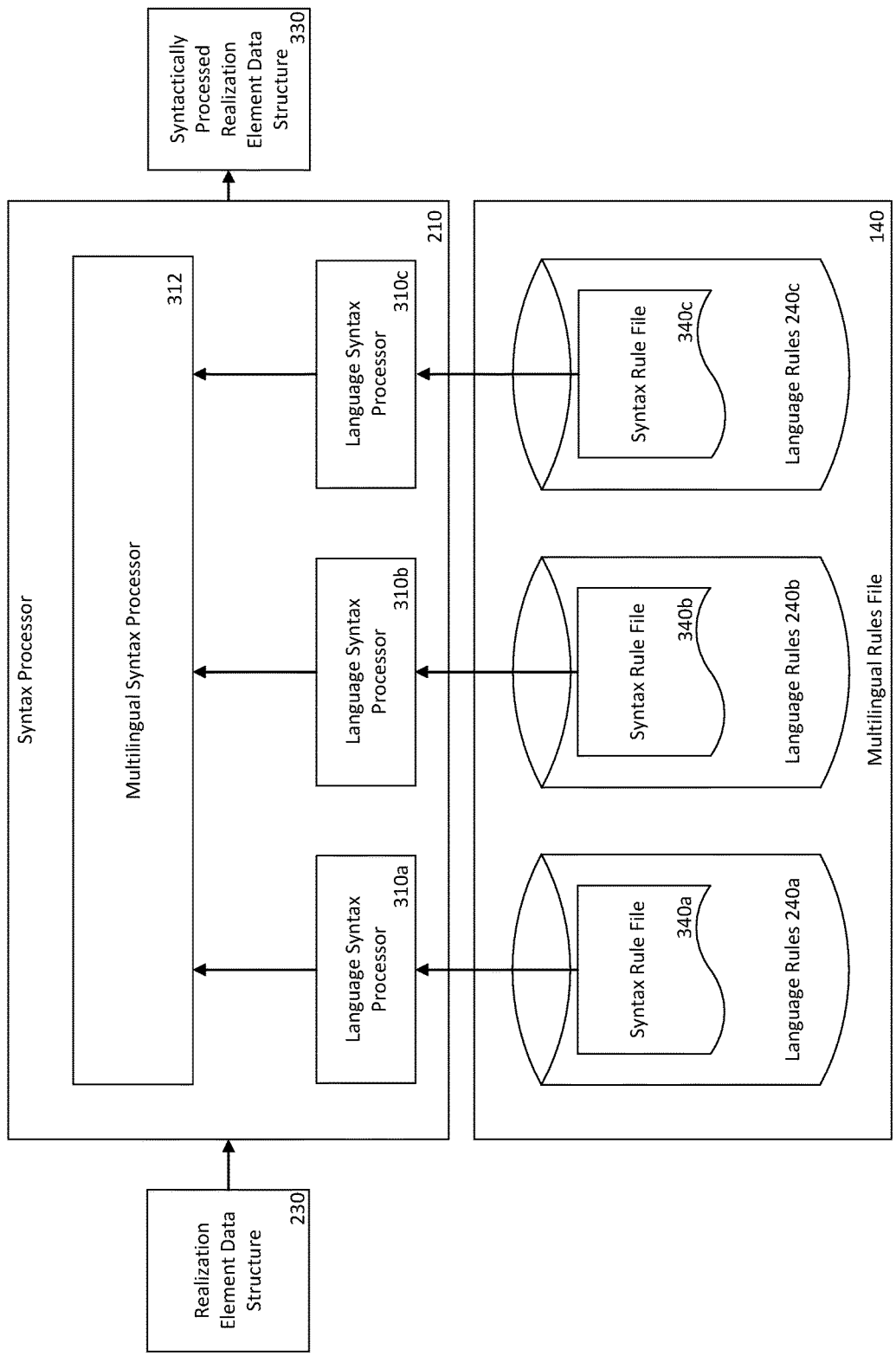
Figure 4:
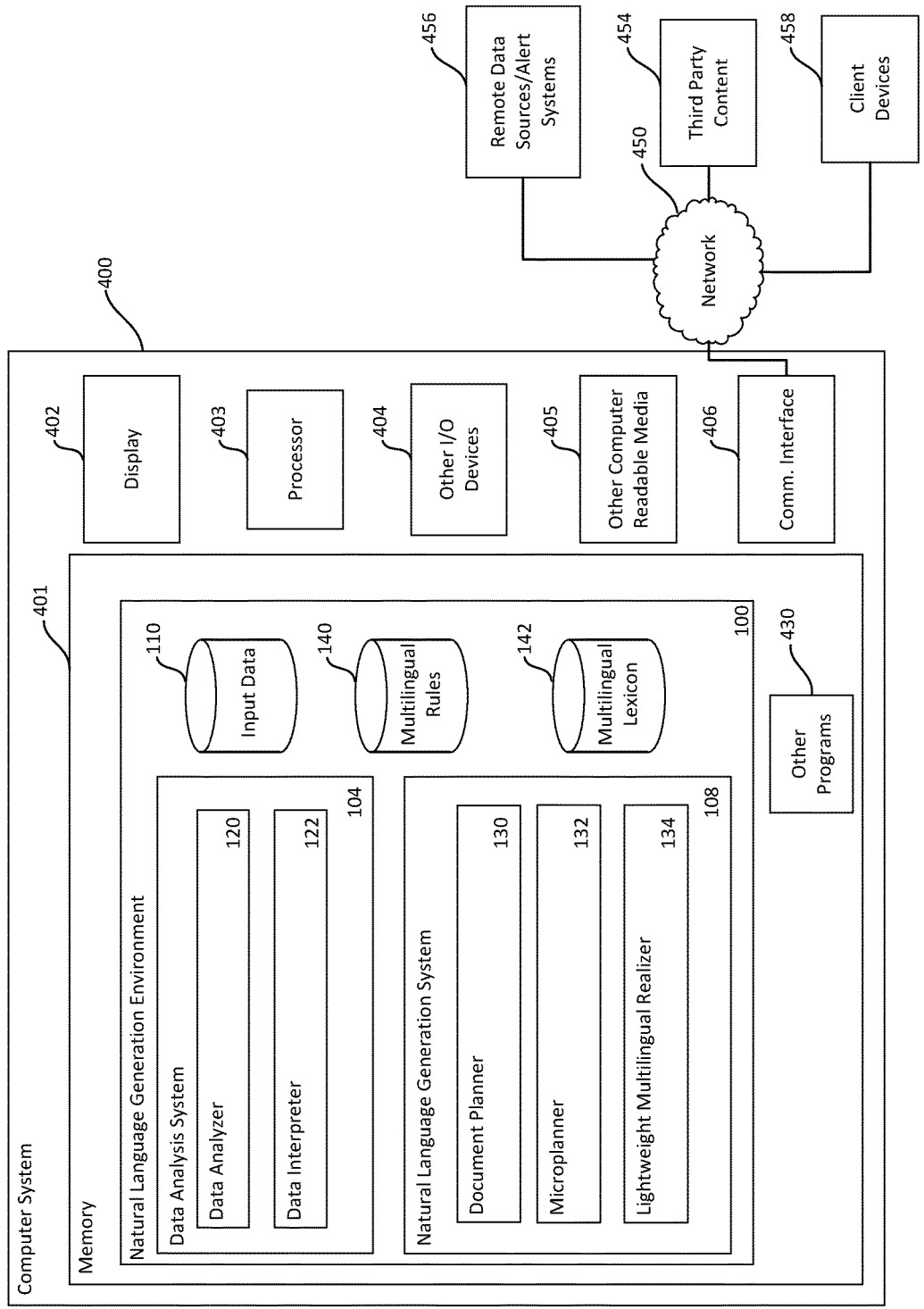
Figure 5:
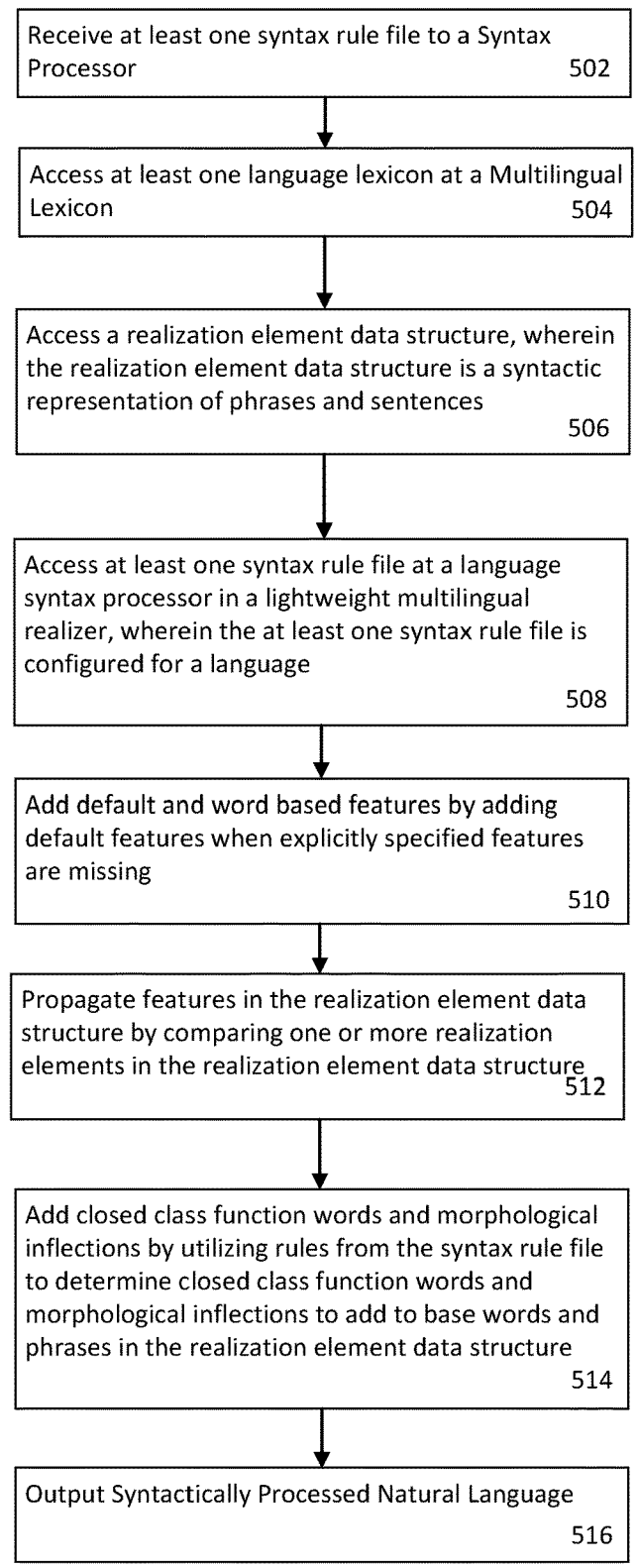
Figure 6:
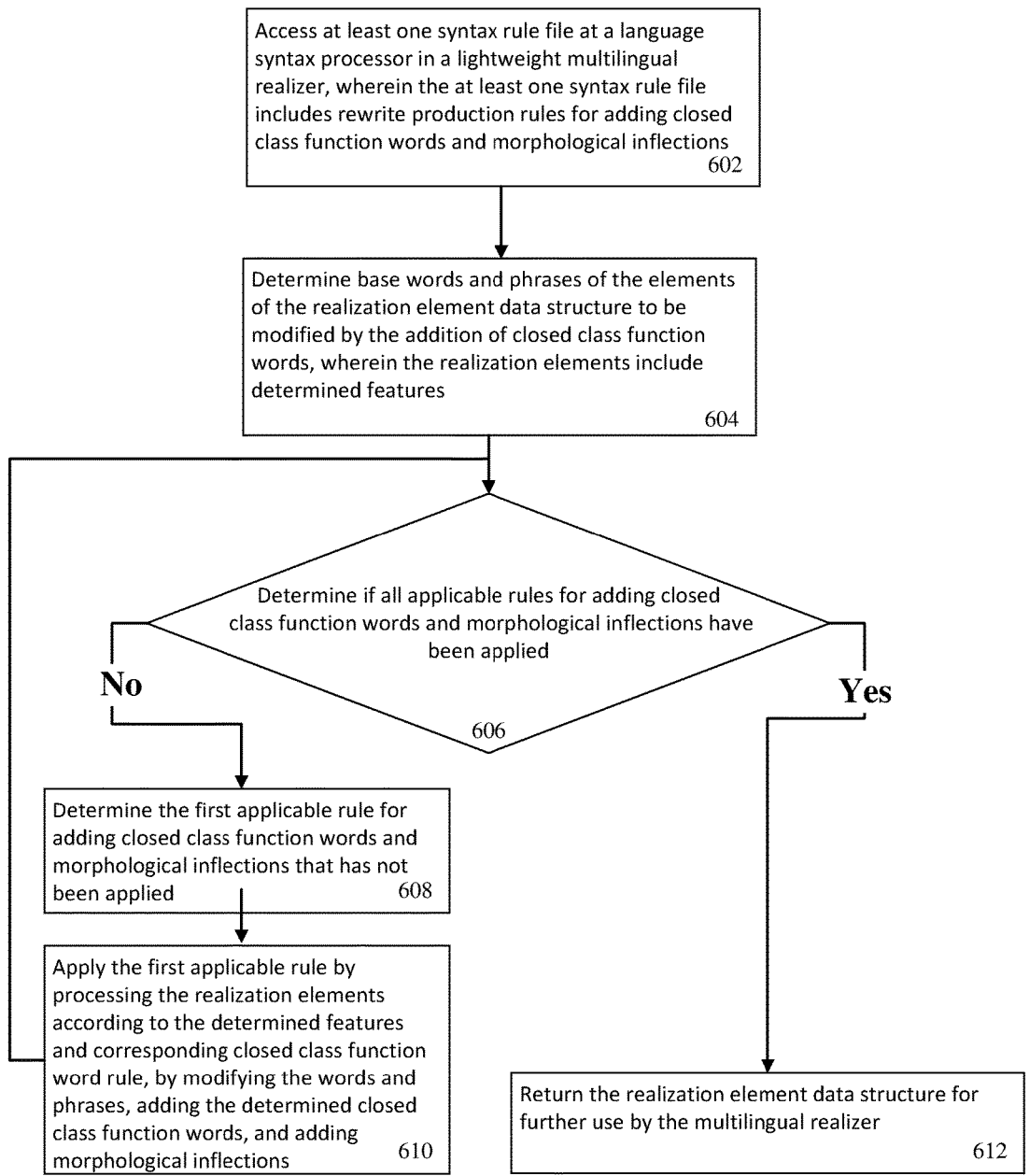

Having thus described embodiments of the invention in general terms, reference will now be made to the accompanying drawings, which are not necessarily drawn to scale, and wherein:

FIG. 1 is a schematic representation of natural language generation environment that may benefit from some example embodiments of the present invention;

FIG. 2 illustrates an example configurable lightweight multilingual realizer according to some example embodiments described herein;

FIG. 3 illustrates an example syntax processor according to some example embodiments described herein;

FIG. 4 illustrates a block diagram of an apparatus that embodies a lightweight multilingual realizer system in accordance with some example embodiments of the present invention; and FIGS. 5 and 6 illustrate flowcharts that may be performed by a lightweight multilingual natural language realizer in accordance with some example embodiments of the present invention.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

In some examples, the stage of natural language generation known as sentence planning and/or microplanning includes the process of transforming, mapping or otherwise converting fragments of data, information or the like (e.g. messages) into specifications (e.g. phrase specifications, sentence plans or the like), such that the specifications can be further processed by a realizer (e.g. a linguistic realization component). In some examples, the stage of natural language generation known as realization includes the process of mapping such a specification, and its constituent phrase specifications (referred to hereinafter as "realization elements"), into surface text. Surface text, in some examples, includes words, punctuation symbols, and markup annotation.

In some examples, the example microplanner disclosed herein is configured to generate text specifications for a given language wherein the base words and phrases are mostly ordered into a syntactic representation of phrases and sentences. In some examples, a realizer is then able to more simply and efficiently process realization elements in the text specification, so as to be able to transform the language specific realization elements into surface text in the given language.

In some examples, the ability for the example lightweight multilingual realizer to receive ordered words allows for the realizer to forego the traditional rules and process of re-ordering words, leading to not only a lightweight nature for the realizer, but also leading to the ability to advantageously add support for multiple languages. That is, given the design described herein, adding a language to the lightweight multilingual realizer comprises constructing feature propagation rules for the language to be added to the realizer, and writing rules for adding closed class function words and morphological inflections.

For example, adding a language, such as Portuguese, to a lightweight multilingual realizer, which may include a previously implemented language such as English, may consist of first writing a set of feature rules describing how features propagate in Portuguese. Feature propagation in Portuguese may include variations that are different from the English rules in the multilingual processor. These variations can include gendered words and phrases found in Portuguese, but not English. Adding Portuguese will also consist of writing rules for adding closed class function words and morphological inflections. The rules can then be implemented by the lightweight multilingual realizer and allow for the realizer to accept realization elements from the microplanner in either English or Portuguese.

In some embodiments, the lightweight multilingual nature of the realizer described herein allows for more maintainable code and more correct natural language generation, even as multiple new languages utilize the realizer. That is, the realizer itself is also more flexible as it allows for ease of adding or modifying languages, or dialects of languages. Importantly, the systems and methods below provide separate processing modules for propagating features, and adding closed class function words and morphological inflections. That is, each of the modules are configured to operate independently of one another. Such independence allows for the modules to be modifiable to account for languages with distinct syntax and grammar structures.

Additionally, the systems and methods described herein provide a robust realization component that allows for a generic parent class that presents an application programming interface that allows for language specific implementations with each language having its own specific rule files for operation. Specifically, a realization element is processed, in some examples, so as to propagate features, add closed-class function words, such as the insertion of conjunctions (and, or), articles (a, the), demonstratives (this, that) and prepositions (to, from, at, with), and add morphological inflections. Closed-class function words may also include "not", "will", and auxiliary verbs.

In some embodiments, realization elements can be received into the realizer from sources other than the microplanner, such as a document planner or a template. In some examples, a realizer may be called from a template via lightweight NLG services. For example, a template may specify the verb EAT and the features negated:true, progressive:true, and invoke the realizer, via a lightweight NLG service (without invoking a document planner and/or microplanner), to produce the string "is not eating", which is subsequently inserted into the template by the realizer.

FIG. 1 is an example block diagram of example components of an example natural language generation environment 100. In some example embodiments, the natural language generation environment 100 comprises a natural language generation system 108, input data 110, and a data analysis system 104. The natural language generation system 108 may take the form of, for example, a code module, a component, circuitry and/or the like. The components of the natural language generation environment 100 are configured to provide various logic (e.g. code, instructions, functions, routines and/or the like) and/or services related to the lightweight multilingual natural language realizer.

The data analysis system 104 is configured to store generated messages that are sent to the natural language generation system 108. Messages are language independent data structures that correspond to informational elements in a text and/or collect together underlying data, referred to as slots, arguments or features, which can be presented within a fragment of natural language such as a phrase or sentence. Messages may be represented in various ways; for example, each slot may consist of a named attribute and its corresponding value; these values may recursively consist of sets of named attributes and their values, and each message may belong to one of a set of predefined types. The concepts and relationships that make up messages may be drawn from an ontology that formally represents knowledge about the application scenario.

In some examples, messages are created based on a requirements analysis as to what is to be communicated for a particular scenario (e.g. for a particular domain or genre). A message typically corresponds to a fact about the underlying data (for example, the existence of some observed event) that could be expressed via a simple sentence (although it will ultimately be realized by some other linguistic means). For example, to linguistically describe wind, a user may want to know a speed, a direction, a time period or the like, but the user may also want to know changes in speed over time, warm or cold fronts, geographic areas and or the like. In some cases, users do not even want to know wind speed values, but instead want an indication that describes the presence of a dangerous wind condition. Thus, a message related to wind speed may include fields to be populated by data related to the speed, direction, time period or the like, and may have other fields related to different time points, front information or the like. The mere fact that wind exists may be found in the data, but to linguistically describe "light wind" or "gusts" different data interpretation must be undertaken as is described herein.

In some examples, a message is created in an instance in which the raw input data warrants the construction of such a message. For example, a wind message would only be constructed in an instance in which wind data was present in the raw input data. Alternatively or additionally, while messages may correspond directly to observations taken from a raw data input, others may be derived from the observations by means of a process of inference or based on one or more detected events. For example, the presence of rain may be indicative of other conditions, such as the potential for snow at some temperatures.

Messages may be instantiated based on many variations of source data, such as but not limited to time series data, time and space data, data from multiple data channels, an ontology, sentence or phrase extraction from one or more texts, a text, survey responses, structured data, unstructured data and/or the like. For example, in some cases, messages may be generated based on text related to multiple news articles focused on the same or similar news stories in order to generate a news story; whereas in other examples, messages may be built based on survey responses and/or event data.

Messages may be annotated with an indication of their relative importance; this information can be used in subsequent processing steps or by the natural language generation system 108 to make decisions about which information may be conveyed and which information may be suppressed. Alternatively or additionally, messages may include information on relationships between the one or more messages.

In some examples, one or more messages may be built based on raw input data, such as the time-series data in the following table:

| Time | Heart Rate | Respiration Rate |
|------|------------|------------------|
| 1    | 68         | 14               |
| 2    | 72         | 15               |
| 3    | 70         | 14               |
| 4    | 70         | 14               |
| 5    | 69         | 16               |
| 6    | 72         | 15               |
| 7    | 73         | 16               |
| 8    | 68         | 13               |
| 9    | 70         | 14               |
| 10   | 71         | 15               |
| 11   | 90         | 14               |
| 12   | 110        | 14               |
| 13   | 118        | 14               |
| 14   | 116        | 15               |
| 15   | 105        | 15               |
| 16   | 92         | 14               |
| 17   | 86         | 13               |
| 18   | 80         | 14               |
| 19   | 75         | 14               |
| 20   | 72         | 15               |
| 21   | 70         | 14               |
| 22   | 71         | 13               |
| 23   | 69         | 13               |
| 24   | 71         | 14               |

Using the heart rate data channel in the above table as an example, a message may include a patient or reference name, a period, a change in heart rate, a starting heart rate, a high heart rate and an ending heart rate.

In some example embodiments, a natural language generation system, such as natural language generation system 108, is configured to generate phrases, sentences, text or the like which may take the form of natural language text. The natural language generation system 108 comprises a document planner 130, a microplanner 132 and/or a natural language realizer such as lightweight multilingual realizer 134. The natural language generation system 108 may also be in data communication with a multilingual rules file 140 and a multilingual lexicon 142.

In some examples, the multilingual rules 140, used in conjunction with the multilingual lexicon include, but are not limited to, a plurality of language rule files, each of the plurality of language rule files including a syntax rule file, which in some examples includes rules to add closed class function words and morphological inflections, and propagate features. In some examples, the plurality of languages rule files may also include a morphology rule file, a morphophonology rule file, an orthography rule file, and/or a mark-up rule file, which may be used by the document planner 130, the microplanner 132 and/or the lightweight multilingual realizer 134. The multilingual rules 140 are further described with respect to FIG. 2. Other natural language generation systems may be used in some example embodiments, such as a natural language generation system as described in Building Natural Language Generation Systems by Ehud Reiter and Robert Dale, Cambridge University Press (2000), which is incorporated by reference in its entirety herein.

A lexicon is a "dictionary" for stored words of a particular language. It identifies the part of speech and other information about words. A lexicon may also include information concerning morphological inflections, syntactic features (such as transitive verbs), whether to include "a" or "an" before a given word, and spelling variants of a single word (such as "colour" and "color"). Accordingly, multilingual lexicon 142, may comprise a single lexicon for a single language, and/or multiple lexicons that in turn support one or more languages.

The document planner 130 is configured to input the one or more messages from the data analysis system 104. The document planner 130 is further configured to determine how to arrange those messages in order to describe the patterns in the one or more data channels derived from the raw input data. The document planner 130 may comprise a content determination process that is configured to select the messages, such as the messages that contain a representation of the data that is to be output via a natural language text.

The document planner 130 may also comprise a structuring process that determines the order of messages to be included in a text. In some example embodiments, the document planner 130 may access one or more text schemas for the purposes of content determination and document structuring. A text schema is a rule set that defines the order in which a number of messages are to be presented in a document. For example, an event message (e.g. medication injection) may be described prior to a key event message (e.g. rise in heart rate). In other examples, a significant event message (e.g. falling pulse) may be described after, but in relation to, a key event message (e.g. rise in heart rate).

The output of the document planner 130 may be a tree-structured object or other data structure that is referred to as a document plan. In an instance in which a tree-structured object is chosen for the document plan, the leaf nodes of the tree may contain the messages, and the intermediate nodes of the tree structure object may be configured to indicate how the subordinate nodes are related (e.g. elaboration, consequence, contrast, sequence and/or the like) to each other, specify document structure (e.g. paragraph breaks) and/or the like.

The microplanner 132 generates a realization element data structure. The realization element data structure is then output by the microplanner 132 to the lightweight multilingual realizer 134, to express the text specification in natural language. The realization process is further described with regard to FIGS. 2, 3, 5, and 6. The output of the process is, in some example embodiments, a well-formed natural language text that takes the form, in some examples, of a sentence in a designated language. In some examples, the natural language text may include embedded mark-up.

FIG. 2 is an example block diagram of example components of an example lightweight multilingual realizer 134 in operation with a multilingual rules file 140 and multilingual lexicon 142. The multilingual lexicon 142, in some examples, is a vocabulary or language from a plurality of languages and enables the inclusion of multiple language specific lexicons such as lexicons 242a, 242b, and 242c. In some embodiments, each of the lexicons 242a, 242b, 242c, represent vocabularies of different languages such as English, German, and French respectively. In some embodiments, the syntax processor 210, the morphology processor 212, and the morphophonology processor 214 are configured to query the multilingual lexicon 142 and the language specific lexicons 242a, 242b, and 242c.

The multilingual rules file 140 include at least one language rules file such as 240a, 240b, and 240c. In some embodiments, each of the language rules files 240a, 240b, and 240c represent realization rules of different languages such as English, German, and French. Each of these files may include rules for each of several realization operations such as syntax operations, morphology operations, morphophonology operations, orthography operations, and mark-up operations. Each of these rule files is configured, in some examples, to be accessed, read, and the rules implemented by one or more of the syntax, morphology, morphophonology, orthography, or mark-up processors. This process for syntax operations, within realizer 210, is further described with respect to FIGS. 3, 5, and 6. This process for morphology operations, morphophonology operations, orthography operations, and mark-up operations is described below.

The language rules file 240a, 240b, and 240c may also be configured to include rules for other syntax operations described in FIG. 3. The language rules files 240a, 240b, and 240c may also be similarly configured to optionally include rules for morphology, morphophonology, orthography, and mark-up operations according to the language of the rule file. Wherein each of the language rules files also includes rules for the realizer processors as described below.

The lightweight multilingual realizer 134, in some examples, may include processors to complete realization operations including a syntax processor 210, a morphology processor 212, a morphophonology processor 214, an orthography processor 216, and a mark-up processor 218. In operation, the lightweight multilingual realizer 134 is configured to receive and access realization elements, such as realization element data structure 230, including a syntactic representation of phrases and sentences and output natural language text 250, which represents the realization elements in well-formed and realized natural language text. In some examples, all of the processors to complete realization operations are optional. In some examples, the morphophonology processor 214, the orthography processor 215, and the mark-up processor are all optional. For example, a realization element data structure 230 may not need to be processed by the morphophonology processor 214 or the mark-up processor 218, and thus these processors will not be utilized.

The syntax processor 210 is configured, in some example embodiments, to access an input, such as realization element data structure 230, and apply syntactic rules to generate natural language using a syntax rule file, such as a syntax rule file included in language rules file 240a from a multilingual rules file 140. The syntax processor 210 is further configured, in conjunction with a multilingual rules file 140, to at least add closed class function words such as conjunctions (e.g. and, or), articles (a, the), demonstratives (this, that) and prepositions (to, from, at, with). In some embodiments, the syntax processor 210 is also configured, in conjunction with a multilingual rules file 140, to add morphological inflections. In some embodiments, the syntax processor 210 is also configured, in conjunction with a multilingual rules file 140, to at least propagate features in the realization element data structure 230. The operations and functionality of the syntax processor 210 is further described with regard to FIGS. 3, 5, and 6.

The morphology processor 212 of FIG. 2 is configured, in some embodiments, to receive an input from syntax processor 210, such as a syntactically updated realization element data structure 230, and to use at least one morphology rule file, such as a morphology rule file containing morphology rules, within a language rule file, such as language rules 240a, comprising part of a multilingual rules file 140. The morphology rule file containing morphology rules is utilized in the language morphology processor 212 to generate a morphologically processed realization element data structure 230.

Morphology is accomplished by mapping base words forms into inflected word forms, by modifying the words of the element data structure into an inflected word form according to the language morphology rule file. By way of example, given an input "John, love, mango," wherein mango includes the plural feature (i.e., mango[number: plural]), the morphology processor 212 is configured to output "John loves mangoes." The morphing of love and mango from the base form to the inflected form is morphology. Alternatively or additionally, the morphology processor 212 may map inflected word forms to base word forms prior to mapping the base word forms to inflected word forms, to avoid errors in inflection.

In some examples, the morphology processor 212 is configured to mark the base word forms by the part of speech (pos) from which they come so that, for example, the noun date (day of the month or sweet edible fruit) is not confused with the verb date (assign a date to or meet a with a lover). In some examples, the correct part of speech may be taken from the input realization element. For example, love may be marked pos=verb. In this example, the morphology processor 212 is informed by the input realization element as to what base form it should identify, such as when searching multilingual lexicon 142.

In some example embodiments, the morphology processor 212 determines, for a particular word or phrase that is being processed, if the multilingual lexicon 142 records a non-standard inflected form (e.g., children as the plural of child). If so, the recorded form is used. If no recorded form is found, default morphology rules are used to form the inflected form (e.g., add "s" or "es" to form a plural, depending on the last letter of the base form, also change "y" to "i"). Alternatively or additionally, another example expression of the rules may include:

01. <rule conditions="pos=verb tense="past">
02. <use>past</use>
03. <regex in="y$" out="ied"/>
04. <regex in="e$" out="ed"/>
05. <regex in="$" out="ed"/>
06. </rule>

In some examples, the morphology processor 212 is configured to receive a base word form and to access the lexicon, such as multilingual lexicon 142 to determine if it specifies the inflected form. If it does not, default morphology rules are applied as shown above. For example, in the case of arise the default output would be arised. However, the lexicon will override this default setting and specify arose.

In some examples, the morphophonology processor 214 is configured to receive an input, such as a processed realization element data structure 230, from morphology processor 212. In some examples, the morphophonology processor 214 may be configured to use at least one language morphophonology rule file, such as a morphophonology rule file containing morphophonology rules, within a language rule file, such as language rules 240a, comprising part of a multilingual rules file 140, to generate a morphophonologically processed realization element data structure 230. For example, the morphophonology processor 214 may be configured to determine a prefix or indefinite article such as the English words "a" or "an." This can be determined from a list of prefixes stored in memory. In some examples, the prefixes stored in memory specify that "an" should be used before any word that starts with the letters "um" (e.g., "an umbrella") but "a" for any word starting with "uni" (e.g., "a university"). For example, when receiving a realization element data structure 230 at morphophonology processor 214 including the word components of the sentence "john attends an university", the morphophonology processor will alter the "an" to "a".

The orthography processor 216, in some examples, may be configured to receive an input, such as a processed realization element data structure 230, from the morphophonology processor 214, and to use at least one language orthography rule file, such as an orthography style file containing orthography rules, within a language rule file, such as language rules 240a, comprising part of a multilingual rules file 140, to generate an orthographically processed realization element data structure 230. In some examples, the orthographically processed natural language is generated by capitalizing individual words or sentences by determining which words or sentences from the elements of the realization element data structure 230 to capitalize by comparing the elements of the realization element data structure 230 with the language orthography rule file, and then modifying the determined elements of the realization element data structure 230.

For example, the orthography processor 216 may be configured, in some examples, to input "john loves mangoes". The orthography processor 216 determines from the input realization element data structure 230 and the orthography rules from the orthography rule file, the capitalization and punctuation operations and alters the realization element data structure 230 to the output "John loves mangoes.". In some examples embodiments, capitalization of an input data structure can be controlled in several ways including leaving the capitalization as is, capitalizing the first letter of the first word in a sentence or clause, capitalizing the first letter of every word in a sentence or clause, capitalizing all words in a clause or sentence in upper case, or setting all words in a clause or sentence in lower case.

The mark-up processor 218 of FIG. 2, may be configured in some embodiments to use at least one language mark-up rule file to generate a marked-up realization element data structure 230 by converting internal markups found in realization element data structure 230 into a mark-up format or plurality of formats that can be understood by a plurality of natural language text presentation systems. In some examples, internal markups in the realization element data structure 230 can include bold font or red text. In some examples, the natural language text presentation systems can include HTML, Latex, or Word RTF.

FIG. 3 illustrates an example syntax processor 210. As outlined above, the syntax processor 210 is configured to access realization element data structure 230 and output syntactically processed realization element data structure 330. The realization element data structure 230 may take the form of a phrase specification output by a microplanner. That is, in some examples, the realization element data structure 230 is a syntactic representation of phrases and sentences received from a microplanner. In some examples, the realization element data structure 230 may be received from a lightweight NLG service invoked from a template.

The syntax processor 210 is configured to include a multilingual syntax processor 312 that is configured along with one or more language syntax processors 310a, 310b, and/or 310c, to access and process the received realization element data structure according to a specific language. That is, language syntax processors 310a, 310b, and/or 310c are configured to be operated by multilingual syntax processor 312 to syntactically process a realization element data structure 230 according to a specific language. While processors 310a, 310b, 310c, and 312 are shown separately in FIG. 3, in some examples, they may be the same processor or may work in conjunction with each other on the same or shared processor.

The language syntax processors 310a, 310b, and/or 310c are configured to access a syntax rule file, such as syntax rule file 340a as part of a language rules file 240a, comprising part of a multilingual rules file 140. In some examples, the syntax rule file, such as syntax rule file 340a, may include rules for setting default features, adding closed class function words and morphological inflections, and/or propagating features. In some examples, rules for setting certain default language features, such as setting gender or tense to be used when processing the realization element data structure may be included in the syntax rule file 340a.

In some examples, a language rules file that is input by the syntax processor 210 may include feature propagation rules. In some example embodiments, feature propagation may be included alongside default feature rules above in the syntax rule file 340a which comprise part of a language rules file 240a and multilingual rules file 140. In some examples, these default rules may be formatted to include the following English language example:

NounPhrase: noun.plural=specifier.plural [the plural value of an NP's noun is the same as the plural value of an NP's specifier]

NounPhrase: plural=noun.plural [the plural value of an NP as a whole is the same as the plural value of the NP's noun]

Clause: verb.plural=subject.plural [the plural value of a clause's verb is the same as the plural value of the clause's subject]

Clause: [if verb=BE] object.plural=verb.plural [the plural value of a clause's object is the same as the plural value of the clause's verb, if the verb is BE]

In some example embodiments, the syntax processor 210 may be configured to include one or more language specific syntax processors, such as language syntax processors 310a, 310b, and 310c, and a multilingual syntax processor 312. The language specific syntax processors 310a, 310b, and 310c are configured to build a syntax based on the syntax rule file received, such as syntax rule files 340a, 340b, and 340c and/or perform language specific syntax functions. For example, language specific syntax functions may include adding closed-class functions words and morphological inflections and determining features. Closed class functions words include for example: conjunctions (e.g. and, or), articles (a, the), demonstratives (this, that) and prepositions (to, from, at, with).

In some embodiments, the syntax processor 210 is configured to access an unrealized realization element data structure 230 and output a syntactically processed realization element data structure 330. The realization element data structure 230 may be syntactic representations of phrases and sentences received from a microplanner. For example, an input data structure may include:

```
<Sentence tense=past negated=true>
<NP role=subject>
    <Noun word="John"/>
    </N P>
<VP>
    <Verb word="buy"/>
      <NP role=object>
        <Number int="100"/>
        <Noun word="share"/>
      </N P>
    <NP>
</Sentence>
```

The output syntactically processed realization element data structure is generated by the syntax realizer 210 by using the language specific syntax processors, such as language syntax processor 310a, to perform language specific syntax operations and the multilingual syntax processor, such as multilingual syntax processor 312 to perform general syntax operations. The output is a syntactically processed realization element data structure, which may be outputted into the syntactically processed realization element data structure 330. For example, the updated data structure may include after the operation of the syntax processor:

```
<Sentence tense=past negated=true>
    <NP role=subject person=third number=singular>
        <Noun word="John" form=singular/>
    </N P>
    <VP  person=third   number=singular   tense=past
      negated=true>
        <Verb word="do" form=simplePast/>
        <Word word="not" form=standard>
        <Verb word="buy" form=infinitive/>
        <NP role=object number=plural>
            <Number int="100" form=standard/>
            <Noun word="share" form=plural/>
        </N P>
    <NP>
</Sentence>
```

In some examples, the realization element data structure 230 may be syntactic representations of phrases and sentences received from sources other than the microplanner, such as a lightweight NLG service invoked from a template.

FIG. 4 is an example block diagram of an example computing device for practicing embodiments of an example lightweight multilingual realizer 134. In particular, FIG. 4 shows a computing system 400 that may be utilized to implement a natural language generation environment 100 having data analysis system 104 including in some examples a data analyzer 120 and a data interpreter 122. The natural language environment 100 also having a natural language generation system 108 including, in some examples, a document planner 130, a microplanner 132 and/or a lightweight multilingual realizer 134. One or more general purpose or special purpose computing systems/devices may be used to implement the natural language generation system 108. In addition, the computing system 400 may comprise one or more distinct computing systems/devices and may span distributed locations. In some example embodiments, the natural language generation system 108 may be configured to operate remotely via the network 450. In other example embodiments, a pre-processing module or other module that requires heavy computational load may be configured to perform that computational load and thus may be on a remote device or server. For example, the lightweight multilingual realizer 134 may be accessed remotely. Furthermore, each block shown may represent one or more such blocks as appropriate to a specific example embodiment. In some cases, one or more of the blocks may be combined with other blocks. Also, the natural language generation system 108 may be implemented in software, hardware, firmware, or in some combination to achieve the capabilities described herein.

In the example embodiment shown, computing system 400 comprises a computer memory ("memory") 401, a display 402, one or more processors 403, input/output devices 404 (e.g., keyboard, mouse, CRT or LCD display, touch screen, gesture sensing device and/or the like), other computer-readable media 405, and communications interface 406. The processor 403 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 4 as a single processor, in some embodiments the processor 403 comprises a plurality of processors. The plurality of processors may be in operative communication with each other and may be collectively configured to perform one or more functionalities of the lightweight multilingual realizer as described herein.

The natural language generation system 108 is shown residing in memory 401. The memory 401 may comprise, for example, transitory and/or non-transitory memory, such as volatile memory, non-volatile memory, or some combination thereof. Although illustrated in FIG. 4 as a single memory, the memory 401 may comprise a plurality of memories. The plurality of memories may be embodied on a single computing device or may be distributed across a plurality of computing devices collectively configured to function as the configurable microplanner system. In various example embodiments, the memory 401 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of the natural language generation system 108 may be stored on and/or transmitted over the other computer-readable media 405. The components of the natural language generation system 108 preferably execute on one or more processors 403 and are configured to enable operation of a configurable lightweight multilingual realizer, as described herein.

Alternatively or additionally, other code or programs 430 (e.g., an administrative interface, a Web server, and the like) and potentially other data repositories, also reside in the memory 401, and preferably execute on one or more processors 403. Of note, one or more of the components in FIG. 4 may not be present in any specific implementation. For example, some embodiments may not provide other computer readable media 405 or a display 402.

The natural language generation system 108 is further configured to provide functions such as those described with reference to FIG. 1. The natural language generation system 108 may interact with the network 450, via the communications interface 406, with remote data sources 456 (e.g. remote reference data, remote lexicalization rules, remote aggregation data, remote genre parameters and/or the like), third-party content providers 454 and/or client devices 458. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instance the network 450 may take the form of the internet or may be embodied by a cellular network such as an LTE based network. In this regard, the communications interface 406 may be capable of operating with one or more air interface standards, communication protocols, modulation types, access types, and/or the like. The client devices 458 include desktop computing systems, notebook computers, mobile phones, smart phones, personal digital assistants, tablets and/or the like.

In an example embodiment, components/modules of the natural language generation system 108 are implemented using standard programming techniques. For example, the natural language generation system 108 may be implemented as a "native" executable running on the processor 403, along with one or more static or dynamic libraries. In other embodiments, the natural language generation system 108 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the natural language generation system 108, such as by using one or more application programming interfaces can be made available by mechanisms such as through application programming interfaces (API) (e.g. C, C++, C#, and Java); libraries for accessing files, databases, or other data repositories; through scripting languages such as XML; or through Web servers, FTP servers, or other types of servers providing access to stored data. Alternatively or additionally, the input data 110, the multilingual rules file 140 and/or the multilingual lexicon 142 may be local data stores but may also be configured to access data from the remote data sources 456.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the natural language generation system 108 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIGS. 5 and 6 illustrate example flowcharts of the operations performed by an apparatus, such as computing system 400 of FIG. 4, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 401 of an apparatus employing an embodiment of the present invention and executed by a processor 403 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 5 and 6, when executed, convert a computer or processing circuitry into a particular machine configured to perform an example embodiment of the present invention. Accordingly, the operations of FIGS. 5 and 6 define an algorithm for configuring a computer or processor, to perform an example embodiment. In some cases, a general purpose computer may be provided with an instance of the processor which performs the algorithm of FIGS. 5 and 6 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

FIG. 5 is a flowchart illustrating an example method for generating natural language text at a syntax processor, such as by syntax processor 210, in a lightweight multilingual realizer, such as lightweight multilingual realizer 134. In block 502, at least one syntax rule file, such as syntax rule file 340*a*, is received at a language syntax processor, such as language syntax processor 310*a*. The syntax rule file 340*a* may take the form of a general realizer language rule file including language rules for other realizer operations (e.g. morphology, orthography, etc. . . . ) or may be a syntax rule file that is separate from other rule files.

At block 504, at least one language lexicon, such as lexicon 242*a* is accessed at a multilingual lexicon, such as multilingual lexicon 142. In some embodiments the language lexicon can be a language specific separate lexicon, while in other embodiments it may be a part of a multilingual lexicon.

At block 506, the natural language realizer accesses a realization element data structure, such as realization element data structure 230, wherein the realization element data structure is a syntactic representation of phrases and sentences. In some examples, the realization element data structure 230 may be received from a microplanner or may be received from a lightweight NLG service invoked from a template. In some examples, a realization element may define a phrase such as a noun phrase, verb phrase, and/or a prepositional phrase, among others. In some examples, a realization element may define a clause such as a sentence. In some examples, sentence clauses may have a noun phrase, a verb phrase, and an object or any many combinations of the phrases. For example, an input realization element data structure may take the form of:

```
<Sentence tense=past negated=true>
   <NP role=subject>
      <Noun word="John"/>
   </NP>
   <VP>
      <Verb word="buy"/>
      <NP role=object>
         <Number int="100"/>
         <Noun word="share"/>
      </NP>
   <NP>
</Sentence>
```

At block 508, a syntax processor, such as syntax processor 210, accesses at least one syntax rule file, such as syntax rule file 340*a*, and wherein the at least one syntax rule file is configured for a language. For example, syntax rule file 340*a* may be configured to include rules for English language syntax processing, wherein the rules are a collection of rules to aid in the syntactic language operations performed by the syntax processor 210. Examples of components of syntax rules as part of a syntax rule file 340*a* are described above in relation to FIG. 3.

At block 510, a syntax processor, such as syntax processor 210, is configured to add default and word-based features. For example, the syntax processor 210 may first propagate all explicitly specified features determined in the realization element data structure 230. The syntax processor 210 may then add default features when explicitly specified features are missing. For example, if syntax processor 210 determines a noun does not have a number feature set, the syntax processor will set the noun to the default feature, which is singular. In some examples, defaults from feature propagation, can be marked by the syntax processor 210 as "weak" values, which can be subsequently overridden during feature propagation. After adding default and word-based features, the example realization element data structure may take the form of:

```
<Sentence tense=past negated=true>
   <NP role=subject>
      <Noun word="John" person=third number=singular/>
         lexicon says John is third-person singular
   </NP>
   <VP>
      <Verb word="buy"/>
      <NP role=object>
         <Number int="100" number=plural/> rules say 100
            is plural
         <Noun word="share"/>
      </N P>
   <NP>
</Sentence>
```

At block 512, a syntax processor, such as syntax processor 210, is configured to propagate features in the realization element data structure 230 by comparing one or more realization elements in the realization element data structure. Feature propagation and unification is one of the sub-tasks that is performed by the syntax processor 210 in the lightweight multilingual realizer 134. For example, given a realization element data structure 230, including a syntactic tree as input, the realization task is to unify and/or propagate certain syntactic features between different realization elements in the syntactic tree. For example, verifying that there is number agreement between the head noun in an object noun phrase (e.g. singular form of mangoes) with the head main verb (e.g. turning grow into grows). So as seen in some example embodiments, making sure mangoes grow and mango grows are paired together when necessary. After feature propagation, the example realization element data structure may take the form of:

```
<Sentence tense=past negated=true>
    <NP role=subject person=third number=singular>
        <Noun word="John" person=third number=singular/>
    </NP>
    <VP person=third number=singular tense=past negated=true>
        <Verb word="buy" person=third number=singular tense=past negated=true/>
        <NP role=object number=plural>
            <Number int="100" number=plural/>
            <Noun word="share" number=plural/>
        </N P>
    <NP>
</Sentence>
```

Alternatively or additionally, in some examples the syntax processor 210 may first propagate features as shown at block 512 and then, subsequently, add default words and features as shown in block 510.

At block 514, a syntax processor, such as syntax processor 210, is configured to add closed class function words and morphological inflections by utilizing rules from the syntax rule file 340a. The syntax rule file 340a is then used to determine closed class function words to add to the base words and phrases, and to determine the morphological inflections for the base words and phrases in the realization element data structure 230. Addition of closed class function words and morphological inflections is further described in detail in respect to FIG. 6. After insertion of function words and inflections, the example realization element data structure may take the form of:

```
<Sentence tense=past negated=true>
    <NP role=subject person=third number=singular>
        <Noun word="John" form=singular/>
    </N P>
    <VP person=third number=singular tense=past negated=true>
        <Verb word="do" form=simplePast/>
        <Word word="not" form=standard>
        <Verb word="buy" form=infinitive/>
        <NP role=object number=plural>
            <Number int="100" form=standard/>
            <Noun word="share" form=plural/>
        </NP>
    <NP>
</Sentence>
```

At block 516, syntax processor 210 is configured to output the syntactically processed realization element data structure, such as syntactically processed realization element data structure 330. In some embodiments the output can be output directly to a user, or in some embodiments, the output can be further processed such as is shown in FIG. 2. For example, a syntactically processed realization element data structure may take the form of:

```
<Sentence tense=past negated=true>
    <NP role=subject person=third number=singular>
        <Noun word="John" form=singular/>
    </N P>
    <VP person=third number=singular tense=past negated=true>
        <Verb word="do" form=simplePast/>
        <Word word="not" form=standard>
        <Verb word="buy" form=infinitive/>
        <NP role=object number=plural>
            <Number int="100" form=standard/>
            <Noun word="share" form=plural/>
        </N P>
    <NP>
</Sentence>
```

FIG. 6 is a flowchart illustrating an example method for adding closed class function words and morphological inflections. At block 602, a syntax processor, such as by syntax processor 210, is configured to access at least one syntax rule file, such as syntax rule file 340a, wherein the at least one syntax rule file includes rewrite production rules for adding closed class function words and morphological inflections. In some examples, these rules are much simpler than syntactic rules in conventional realizers, since the rules are configured to assume that content words and constituents are mostly ordered. This in turn allows the rewrite production rule files to be smaller, more simple, and easier to write. In some examples, the rewrite production rules may include rules for forming verb groups such as:

Verb[passive:true *]→BE[*] Verb[inflection:pastParticiple]
Verb[progressive:true *]→BE[*] Verb[inflection:presentParticiple]
Verb[perfect:true *]→HAVE[*] Verb[inflection:pastParticiple]
Verb[tense:future *]→WILL Verb[inflection:infinitive]
<Start> BE[negated:true *]→BE[*] NOT
<Start> Verb[negated:true *]<End>→DO[*] NOT Verb[inflection:infinitive]
<Start> Verb[negated:true *]→Verb[*] NOT
Verb[tense:present *]→Verb[inflection:present *]
Verb[tense:past*]→Verb[inflection:past *]

In this example, the rules are constructed so that the left hand side of the rewrite production rules divide "→" are syntactic features (such as tense and passive feature) used to determine the appropriate inflection or closed class function word. For example, left hand rules may include, but are not limited to:

Verb[ ]—can be used to specify any verb (including BE and HAVE).
BE—matches verb BE.
Verb[feature:value *]—matches any verb with this feature:value pairs. "*" refers to remaining feature:value pairs.
<Start> Verb—indicates the verb must occur at the start of the verb group.
<Start> Verb <End>—indicates the verb must occur at the start and end of the verb group (i.e., it is the only word in the verb group).

Furthermore, in this example, the right hand side of the rule divide indicates the closed class function words and features to be added by the syntax processor 210. For example, right hand rules may include, but are not limited to:

Verb—indicates the same verb as on left hand side.
Verb[feature:value]-indicates adding this feature:value to the verb.
Verb [*]—indicates adding remaining feature value pairs from LHS.
DO, NOT, BE, HAVE, WILL—indicates adding this function word.

At block 604, a syntax processor, such as by syntax processor 210, is configured to determine base words and phrases of the elements of the realization element data structure 230 to be modified by the addition of closed class function words, wherein the realization elements include determined features. For example, in the verb group rules described above, the syntax processor 210 is configured to identify the verbs and the determined features of the verbs using the left hand side of a rewrite rule of the set of rewrite rules.

At blocks 606-610 a syntax processor, such as by syntax processor 210, is configured to apply the rules for adding closed class function words and adding morphological inflections by processing the realization elements according to the determined features and corresponding closed class function word rule, by modifying the words and phrase and adding the determined closed class function words and morphological inflections. At decision block 606, a syntax processor, such as by syntax processor 210, is configured to determine if all applicable rules for adding closed class function words and morphological inflections have been applied. If there are rules that have not been applied, for example "No" not all rules have been applied, the syntax processor moves to block 608.

At block 608, a syntax processor, such as syntax processor 210, is configured to determine the first applicable rule for adding closed class function words and morphological inflections that has not been applied.

At block 610, a syntax processor, such as by syntax processor 210 is configured to apply the first applicable rule by processing the realization elements according to the determined features and corresponding closed class function word rule, by modifying the words and phrases and adding the determined closed class function words and morphological inflections.

In some examples, the iterations of blocks 606, 608, and 610 are demonstrated in relation to the verb group formation example described above, the iterations for an input realization element: "EAT[tense:past perfect:true negated:true]" may include:
Iteration 1:
Rule:
Verb[perfect:true *]→HAVE[*] Verb[inflection:pastParticiple]
Result:
HAVE[tense:past negated:true] EAT[inflection:pastParticiple]
Note: *matches features other than perfect:true, on EAT before the rewrite rule is applied; these are added to HAVE after the rewrite rule has been applied
Iteration 2
Rule:
<Start> Verb[negated:true *]→Verb[*] NOT
Result:
HAVE[tense:past] NOT EAT[inflection:pastParticiple]
Iteration 3
Rule:
<Start> Verb[tense: past *]→Verb[inflection:past *]
Result:
HAVE[inflection:past] NOT EAT[inflection:pastParticiple]
Iteration 4
Rule: No applicable rules found.

If at block 606, a syntax processor, such as by syntax processor 210, determines all applicable rules for adding closed class function words have been applied, then the process moves to "Yes" and block 612.

At block 612, a syntax processor, such as by syntax processor 210 is configured to return the realization element data structure for further use by a lightweight multilingual realizer. For example, in the above Iteration 4, the syntax processor 210 may determine no more applicable rules are found and returns the realization element data structure 230 for further use by the lightweight multilingual realizer 134.

In some embodiments, such as adding closed class functions for a verb group, the base words and phrases can include information such as: a head verb (e.g., "eat"), a particle (e.g., "up" in "eat up"), a modal word (e.g., "should" in "should eat"), and adverbs (e.g., "now" in "was now pursuing"). Forms and features (such as tense, negation, perfect tense, progressive tense, and number) are used to specify special verb group forms. Some examples of forms and features include:
Form: regular (e.g., I eat an apple)
Form: infinitive (e.g., "I want to eat an apple")
Form: bare Infinitive (e.g., "I see John eat an apple")
Form: gerund (e.g., "Eating apples is good for you")
Tense: values are
Tense: past (e.g., "I ate an apple)
Tense: present (e.g., "I eat an apple)
Tense: future (e.g., "I will eat an apple)
Negated: values are
Negated: false (e.g., "I ate an apple")
Negated: true (e.g., "I did not eat an apple")
Perfect: values are
Perfect: false (e.g., "I ate an apple")
Perfect: true (e.g., "I had eaten an apple")
Progressive: values are
Progressive: false (e.g., "I ate an apple")
Progressive: true (e.g., "I was eating an apple")
Passive: values are
Passive: false (e.g., "I ate an apple")
Passive: true (e.g., "An apple was eaten by me")
Number: values are
Number: singular (e.g., "I was happy")
Number: plural (e.g., "We were happy").

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:
1. A method for generating syntactically correct natural language, the method comprising:
accessing, using processing circuitry, a realization element data structure, wherein the realization element data structure is a syntactic representation of phrases and sentences; and
accessing, using the processing circuitry, at least one syntax rule file at a syntax processor in a natural language realizer, wherein the at least one syntax rule file is configured for a language;
generating, using the processing circuitry, a syntactically processed realization element data structure, at the syntax processor, using the at least one syntax rule file in the syntax processor by:
propagating, using the processing circuitry, features in the realization element data structure by comparing one or more realization elements in the realization element data structure;
adding, using the processing circuitry and to the realization element data structure, closed class function words and morphological inflections by utilizing rules from the syntax rule file to determine the closed class function words and morphological inflections to add to base words and phrases in the realization element data structure; and
outputting, using the processing circuitry and for display via a computing device, natural language text generated based on the realization element data structure.

2. The method of claim 1, wherein the syntax processor comprises one or more language specific syntax processors, which accesses and applies rules from the syntax rule file.

3. The method of claim 1, wherein adding closed class function words and morphological inflections comprises:
accessing, using the processing circuitry, rewrite production rules for adding closed class function words and morphological inflections in the at least one syntax rule file;
determining, using the processing circuitry, base words and phrases of the elements of the realization element data structure to be modified by the addition of closed class function words and morphological inflections, wherein the realization elements include determined features;
applying, using the processing circuitry, the rewrite production rules for adding close class function words and morphological inflections by iteratively processing the realization elements according to the determined features and corresponding closed class function word rule, by modifying the words and phrases and adding the determined closed class function words and morphological inflections; and
determining, using the processing circuitry, if all applicable rules for adding closed class function words and morphological inflections have been applied and returning the realization element data structure for further use by the natural language realizer.

4. The method of claim 1, wherein propagating features comprises:
applying propagation and unification rules by:
determining, using the processing circuitry, which words from the elements of the data structure to unify by comparing the elements of the data structure with rules for feature unification, and
unifying, using the processing circuitry, features among the elements of the data structure by modifying the determined words according to the rules for feature unification.

5. The method of claim 1, wherein the realization element data structure is received from either a microplanner or a lightweight NLG service invoked from a template.

6. The method of claim 1, wherein the natural language realizer further optionally comprises a morphology processor, a morphophonology processor, an orthography processor, and a mark-up processor, and wherein the natural language realizer outputs fully realized natural language text.

7. The method of claim 6, wherein the morphology processor, the morphophonology processor, the orthography processor, and the mark-up processor each comprise a language specific function processor, which accesses and applies rules from a language specific rule file.

8. The method of claim 6, further comprising generating, using the processing circuitry, a processed realization element data structure, at the morphophonology processor, using the at least one language morphophonology rule file in the language morphophonology processor to generate a morphophonologically processed realization element data structure by:
determining, using the processing circuitry, morphophonological features to modify the elements of the data structure according to the language morphophonology rule file; and
applying, using the processing circuitry, the determined features to the realization elements.

9. The method of claim 6, further comprising generating, using the processing circuitry, a processed realization element data structure, at the orthography processor, using the at least one language orthography style file in the language orthography processor to generate an orthographically processed realization element data structure by at least one of:
capitalizing individual words;
formatting numbers such as applying currency or date formats;
performing punctuation operations; or
placing white space characters between words.

10. The method of claim 6, further comprising generating, using the processing circuitry, a processed realization element data structure, at the mark-up processor, using the at least one language mark-up rule file in the language mark-up processor to generate a marked-up realization element data structure by at least one of:
converting internal markups found in the realization element data structure into a mark-up format or into a plurality of formats that can be understood by a plurality of natural language text presentation systems.

11. The method of claim 1, wherein the natural language realizer receives language specific rule sets, wherein the language specific rule sets comprise:
a syntax rule file, including at least rules to add closed class function words and morphological inflections, and propagate features; and optionally comprises any of:
a language morphology rule file;
a language morphophonology rule file;
a language orthography style file; and
a language mark-up rule file.

12. An apparatus comprising:
at least one processor; and
at least one memory including computer program code, the at least one memory and the computer program code configured to, with the at least one processor, cause the apparatus to at least:
access a realization element data structure, wherein the realization element data structure is a syntactic representation of phrases and sentences; and
access at least one syntax rule file at a syntax processor in a natural language realizer, wherein the at least one syntax rule file is configured for a language;
generate a syntactically processed realization element data structure, at the syntax processor, using the at least one syntax rule file in the syntax processor by:
propagating features in the realization element data structure by comparing one or more realization elements in the realization element data structure;
adding closed class function words and morphological inflections to the realization element data structure by utilizing rules from the syntax rule file to determine closed class function words and morphological inflections to add to base words and phrases in the realization element data structure; and output, for display via a computing device, natural language text generated based on the realization element data structure.

13. A computer program product comprising:

at least one computer readable non-transitory memory medium having program code instructions stored thereon, the program code instructions which when executed by an apparatus cause the apparatus at least to:

access a realization element data structure, wherein the realization element data structure is a syntactic representation of phrases and sentences; and access at least one syntax rule file at a syntax processor in a natural language realizer, wherein the at least one syntax rule file is configured for a language;

generate a syntactically processed realization element data structure, at the syntax processor, using the at least one syntax rule file in the syntax processor by:

propagating features in the realization element data structure by comparing one or more realization elements in the realization element data structure;

adding closed class function words and morphological inflections to the realization element data structure by utilizing rules from the syntax rule file to determine the closed class function words and morphological inflections to add to base words and phrases in the realization element data structure; and output, for display via a computing device, natural language text generated based on the realization element data structure.

\* \* \* \* \*